No. 854,930. PATENTED MAY 28, 1907.
C. A. & L. F. CRANE & F. M. HENTIG.
BUTTER MOLD.
APPLICATION FILED JAN. 3, 1907.
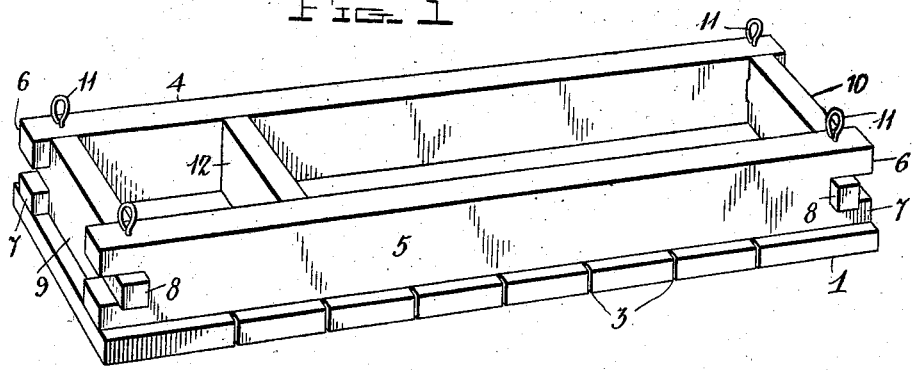
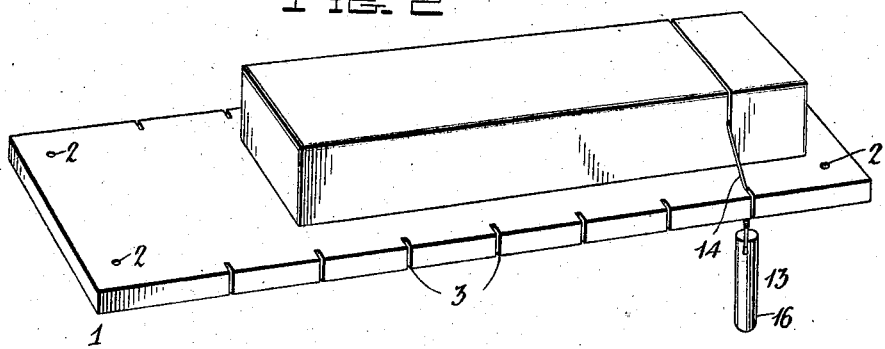
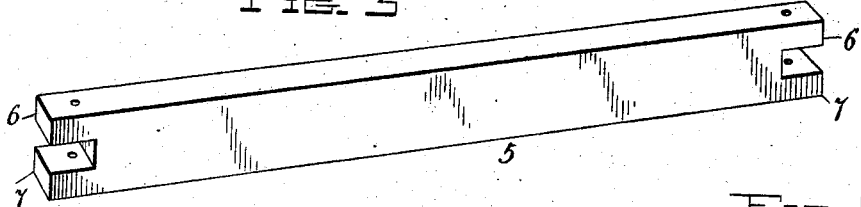
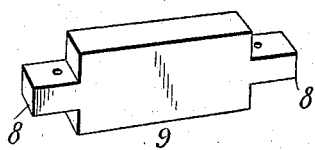
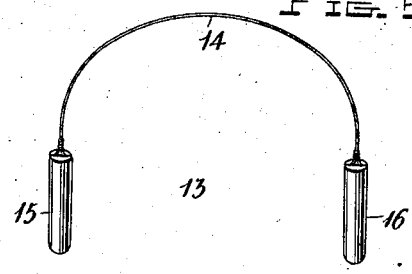
Witnesses
Closser A. Crane,
Lafayette F. Crane and Frank M. Hentig
Inventors
by H. B. Willson &co
Attorneys

UNITED STATES PATENT OFFICE.

CLOSSER A. CRANE, LAFAYETTE F. CRANE, AND FRANK M. HENTIG, OF TOPEKA, KANSAS.

BUTTER-MOLD.

No. 854,930.

Specification of Letters Patent.

Patented May 28, 1907.

Application filed January 3, 1907. Serial No. 350,632.

*To all whom it may concern:*

Be it known that we, CLOSSER A. CRANE, LAFAYETTE F. CRANE, and FRANK M. HENTIG, citizens of the United States, and each residing at Topeka, in the county of Shawnee and State of Kansas, have invented a new and useful Butter-Mold, (to be known as the Crane butter-mold,) of which the following is a specification.
This invention relates to an improved butter mold.

The object of the invention is to provide an improved knockdown butter mold, in which the butter may be quickly molded and divided into pound and half pound packages.

In the accompanying drawings,—Figure 1 represents a perspective view of the mold complete, with the parts assembled ready for use; Fig. 2 represents a perspective view of the mold, showing a block of butter arranged on the base-board thereof, with the side and end members removed and with the cutter in the act of severing said block into small packages; Figs. 3 and 4 represent perspective views of one of the side and end members, respectively; and Fig. 5 represents a perspective view of the severing device or cutter.

In the embodiment illustrated, a rectangular bottom or base-board 1 is shown having an aperture 2 in each corner thereof and provided along its sides and edges with oppositely-disposed notches or grooves, as 3, which extend transversely of the board.
These notches are so spaced as to divide the mold into compartments holding a pound or half pound, as desired. Two side members 4 and 5 have their opposite ends cut out to form tongues 6 and 7, between which the tongues, as 8, of the end members 9 and 10 are adapted to fit. These tongues, as 6, 7 and 8, have registering apertures extending therethrough, which also register with the apertures 2 in the corners of the base-board, and through which pins, as 11, are designed to pass to hold the parts detachably connected.

When it is desired to fill only a part of the mold, a removable block 12 is inserted therein and is adapted to fit transversely of the mold and slide freely between the side members thereof, whereby the interior of the mold may be varied to adapt it to receive any desired quantity of butter to be molded.

A severing device or cutter 13 is used in connection with the mold for separating the molded butter into blocks of the desired size. This cutter comprises a thin wire 14, of a length slightly longer than the width of the mold, and is provided at opposite ends with handles 15 and 16, secured thereto in any desired manner.

In the use of this mold, when the parts are assembled, as shown in Fig. 1, the butter while fresh and pliable is placed thereinto and packed evenly to the top of the sides and ends thereof with a paddle or other suitable implement. The mold is then set aside in a cool place until the butter hardens, when the pins 11 are withdrawn and the sides and ends separated and removed, leaving the molded block of butter on the base-board. The flexible cutter 13 is then placed across the block of butter and drawn downwardly therethrough into two of the grooves or notches on opposite sides of the base-board, as shown in Fig. 2, whereby the butter may be divided into blocks of the desired size. After being cut, as above described, the butter is placed in suitable wrappers and packed away for use or sale.

I claim as my invention,—

1. A butter mold comprising a base-board or bottom having apertures in the corners thereof, and grooves extending transversely of the edges thereof, the grooves at one side being arranged opposite those on the other side, and interlocking side and end members having tongues with apertures extending therethrough and registering with the apertures in the corners of the base-board, and pins extending through said apertures to hold said members detachably connected with the bottom.

2. A butter mold comprising a bottom or base-board having grooves extending transversely of the edges thereof, and side and end members connected with said bottom and with each other, in combination with a flexible cutting member to span said member and operate in said notches.

CLOSSER A. CRANE.
LAFAYETTE F. CRANE.
FRANK M. HENTIG.

Witnesses:
H. D. KULP,
JAMES GILLETT.